US008424136B2

(12) United States Patent
Rozewicz et al.

(10) Patent No.: US 8,424,136 B2
(45) Date of Patent: Apr. 23, 2013

(54) MOBILE TREATMENT TABLE

(75) Inventors: Michael S. Rozewicz, Kalamazoo, MI (US); Kris D. Eager, Richland, MI (US); Dustin L. Worm, Plainwell, MI (US); Dave J. Veldkamp, Grand Rapids, MI (US); Vaughn R. Gerber, Portage, MI (US)

(73) Assignee: Impact Athletic, LLC, Kalamazoo, MI (US)

( * ) Notice: Subject to any disclaimer, the term of this patent is extended or adjusted under 35 U.S.C. 154(b) by 293 days.

(21) Appl. No.: 12/697,339

(22) Filed: Feb. 1, 2010

(65) Prior Publication Data
US 2011/0185501 A1 Aug. 4, 2011

(51) Int. Cl.
*A47B 7/00* (2006.01)
(52) U.S. Cl.
USPC .................. 5/620; 280/30; 280/639; 280/38
(58) Field of Classification Search .................. 5/2.1–5, 5/620, 86.1, 625–627, 110, 111, 174, 178, 5/179, 931, 236.1; 108/134, 135, 65, 69, 108/40, 33, 11, 18; 312/313, 314, 317.1, 312/317.3, 277, 281; 144/285, 286.1; 280/30, 280/639, 37–40, 651, 652
See application file for complete search history.

(56) References Cited

U.S. PATENT DOCUMENTS

| 2,010,855 | A | 8/1935 | Fuller |
| 2,122,969 | A | 7/1938 | Whitcomb |
| 2,233,003 | A | 2/1941 | Epps |
| D142,262 | S | 8/1945 | Paden |
| 2,529,789 | A | 11/1950 | Simonowitz |
| 2,535,646 | A | 12/1950 | Medwin |
| D191,292 | S | 9/1961 | Krauss |
| 3,331,335 | A | 7/1967 | Warfield |
| 3,585,945 | A | 6/1971 | Nielsen |
| 3,771,848 | A | 11/1973 | Claywell |
| 4,228,877 | A | 10/1980 | Cothary |
| 4,333,638 | A | 6/1982 | Gillotti |
| 4,856,435 | A | 8/1989 | Larson |
| 5,009,170 | A | 4/1991 | Spehar |
| 5,067,417 | A | * | 11/1991 | Marmentini et al. ........... 108/36 |
| 5,201,536 | A | 4/1993 | Bono et al. |
| 5,224,531 | A | 7/1993 | Blohm |
| 5,357,872 | A | 10/1994 | Wilmore |
| 5,452,908 | A | 9/1995 | Bencic |
| 5,518,258 | A | 5/1996 | Cox |
| 5,524,555 | A | 6/1996 | Fanuzzi |
| 5,918,331 | A | 7/1999 | Hall et al. |

(Continued)

FOREIGN PATENT DOCUMENTS
GB 2192534 A 1/1988

*Primary Examiner* — Robert G Santos
*Assistant Examiner* — Nicholas Polito
(74) *Attorney, Agent, or Firm* — Honigman Miller Schwartz and Cohn LLP

(57) ABSTRACT

A mobile treatment table having a central support operably connected with a wheel assembly. A support member is pivotally connected with the central support and operable between a vertical position and a horizontal position. At least one support leg is disposed at a distal end of the support member and operable between a deployed position substantially orthogonal to the support member and a non-deployed position substantially parallel with the support member. A handle extends from a proximal end of the support member and forms a portion of the support member when the support member is in the horizontal position.

8 Claims, 17 Drawing Sheets

U.S. PATENT DOCUMENTS

| | | | |
|---|---|---|---|
| 5,941,352 A | 8/1999 | Lee | |
| 5,957,482 A * | 9/1999 | Shorter | 280/639 |
| D418,225 S | 12/1999 | Simpkins et al. | |
| 6,047,750 A | 4/2000 | Jensen | |
| 6,053,587 A | 4/2000 | Boerder | |
| 6,174,026 B1 | 1/2001 | Wise | |
| 6,175,977 B1 | 1/2001 | Schumacher et al. | |
| 6,182,578 B1 | 2/2001 | Fanuzzi | |
| 6,213,265 B1 * | 4/2001 | Wang | 190/11 |
| 6,371,495 B2 | 4/2002 | Thompson | |
| 6,663,074 B2 | 12/2003 | Prior | |
| 6,752,090 B2 | 6/2004 | Schenker et al. | |
| 6,935,641 B2 | 8/2005 | Hahn | |
| 7,255,355 B2 * | 8/2007 | Chisholm et al. | 280/30 |
| 7,389,552 B1 * | 6/2008 | Reed et al. | 5/86.1 |
| 7,451,709 B2 | 11/2008 | Swartfager et al. | |
| 7,493,667 B2 | 2/2009 | Ferko, III | |
| 7,815,215 B1 * | 10/2010 | Lowe | 280/639 |
| 7,988,120 B2 * | 8/2011 | Hsu | 248/439 |
| 2009/0056593 A1 | 3/2009 | Farber et al. | |
| 2009/0145338 A1 | 6/2009 | Panosian et al. | |

\* cited by examiner

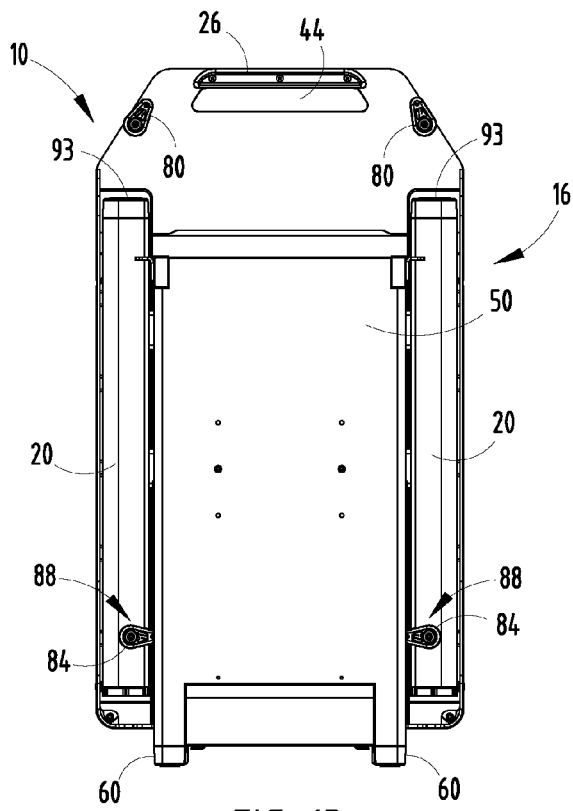
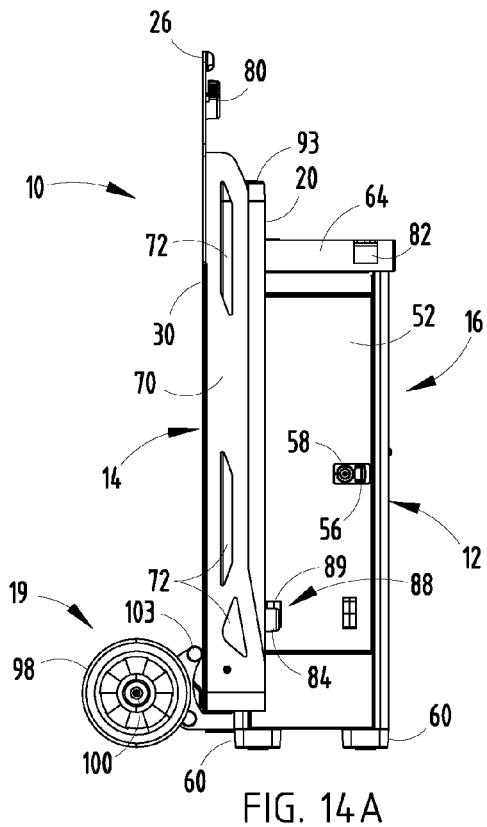
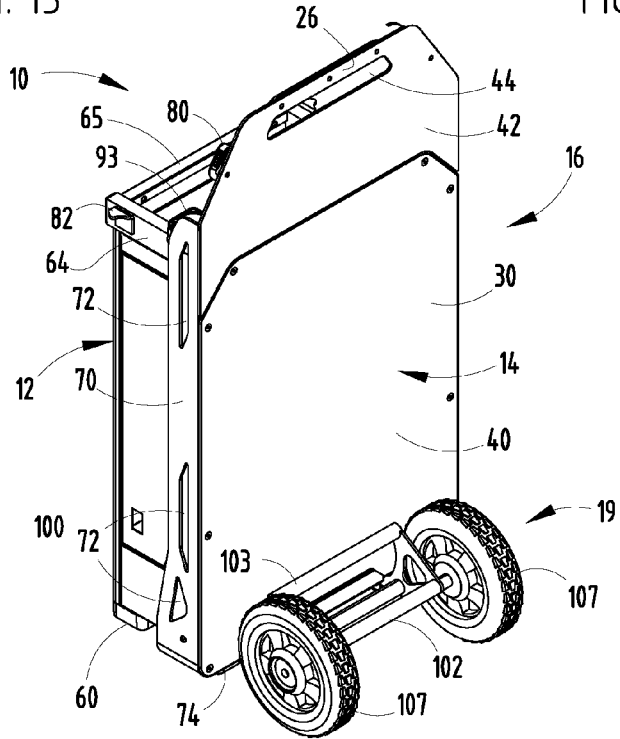
FIG. 13
FIG. 14A
FIG. 14B

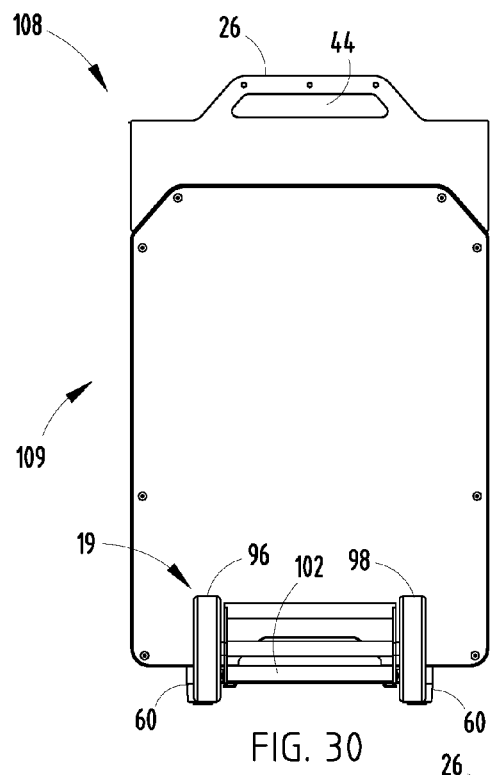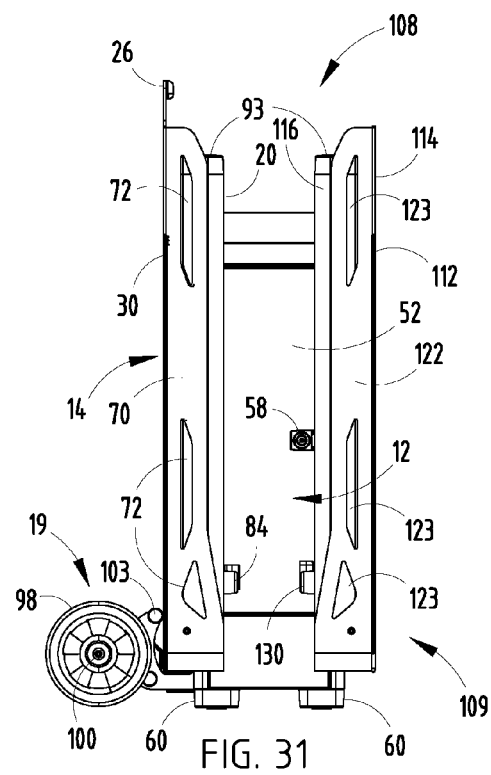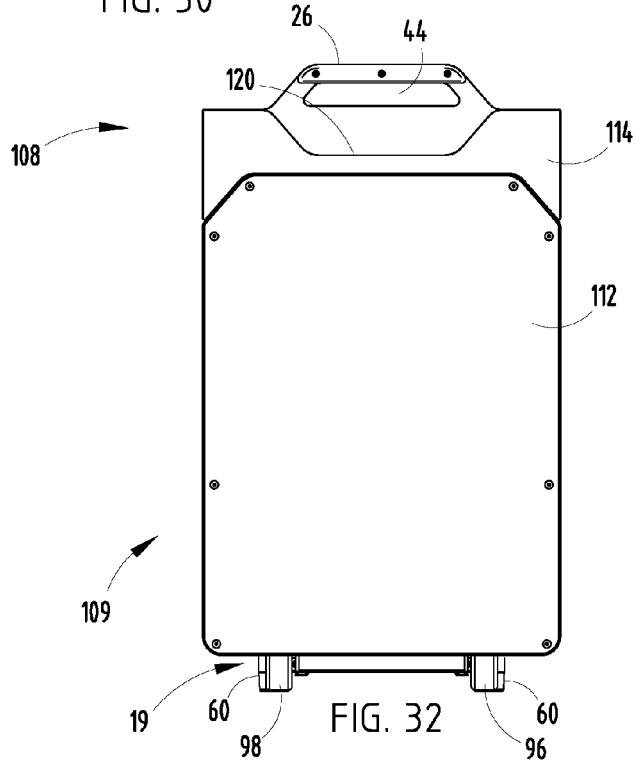

MOBILE TREATMENT TABLE

CROSS-REFERENCE TO RELATED APPLICATION

This application is related to U.S. patent application Ser. No. 12/697,351, filed on Feb. 1, 2010, entitled "MOBILE TREATMENT TABLE," the entire disclosure of which is hereby incorporated herein by reference.

BACKGROUND OF THE INVENTION

The present invention is related to an athletic treatment table and, specifically, to a mobile treatment table transitionable between mobile and operable positions.

SUMMARY OF THE PRESENT INVENTION

One aspect of the present invention includes a mobile treatment table having a central support operably connected with a wheel assembly. A support member is pivotally connected with the central support and operable between a vertical position and a horizontal position. At least one support leg is disposed at a distal end of the support member and operable between a deployed position substantially orthogonal to the support member and a non-deployed position substantially parallel with the support member. A handle extends from a proximal end of the support member and forms a portion of the support member when the support member is in the horizontal position.

Another aspect of the present invention includes a treatment table operable between mobile and operable positions. The improvement includes a support member operable between a substantially vertical position and a substantially horizontal position. The support member includes a handle that forms a portion of the support member. A wheel assembly is operably connected with the support member and positionable between a retracted position and an extended position.

Yet another aspect of the present invention includes a method of making a mobile treatment table. The method includes constructing a center support having at least one storage unit disposed therein. A support member is pivotally connected to a top portion of the center support. The support member is operable between a substantially vertical position and a substantially horizontal position. A wheel assembly is pivotally connected to a distal end of the support member. A handle aperture is formed through the support member.

These and other aspects, objects, and features of the present invention will be understood and appreciated by those skilled in the art upon studying the following specification, claims, and appended drawings.

BRIEF DESCRIPTION OF THE DRAWINGS

FIG. 13 is a side elevational view of the mobile treatment table of FIG. 11;

FIG. 14A is a rear elevational view of the mobile treatment table of FIG. 11;

FIG. 14B is a top perspective view of a mobile treatment table with an all-terrain wheel assembly;

FIG. 30 is a first side elevational view of the mobile treatment table of FIG. 28;

FIG. 31 is a rear elevational view of the mobile treatment table of FIG. 28; and FIG. 32 is a second side elevational view of the mobile treatment table of FIG. 28.

DETAILED DESCRIPTION OF EMBODIMENTS

Figure 1:
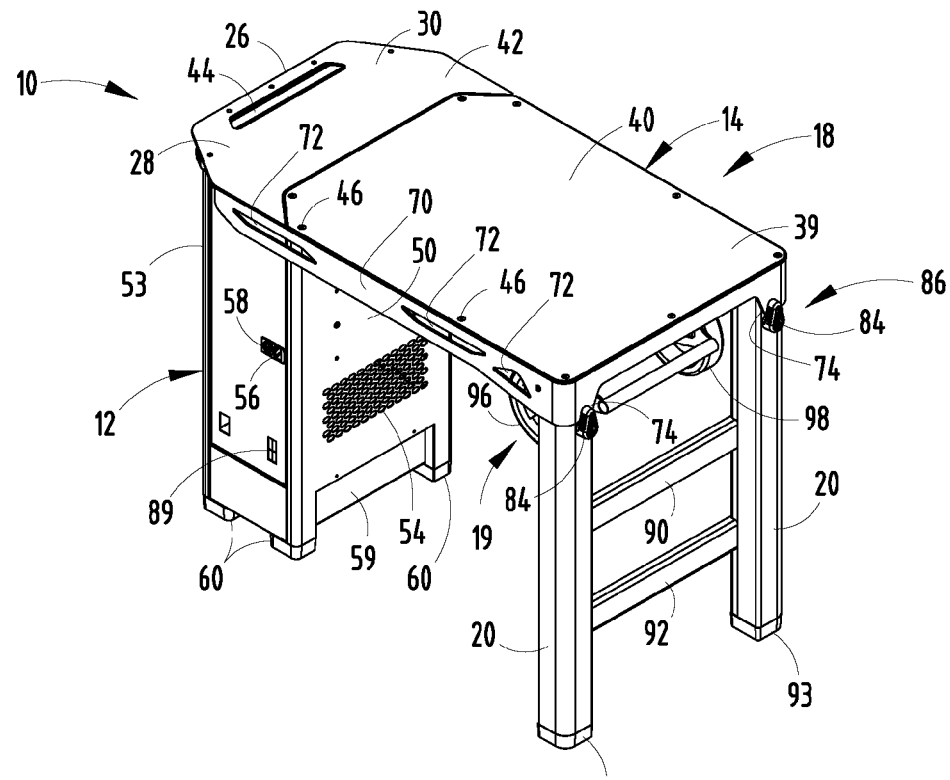
FIG. 1 is a top perspective view of one embodiment of a mobile treatment table.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 10:
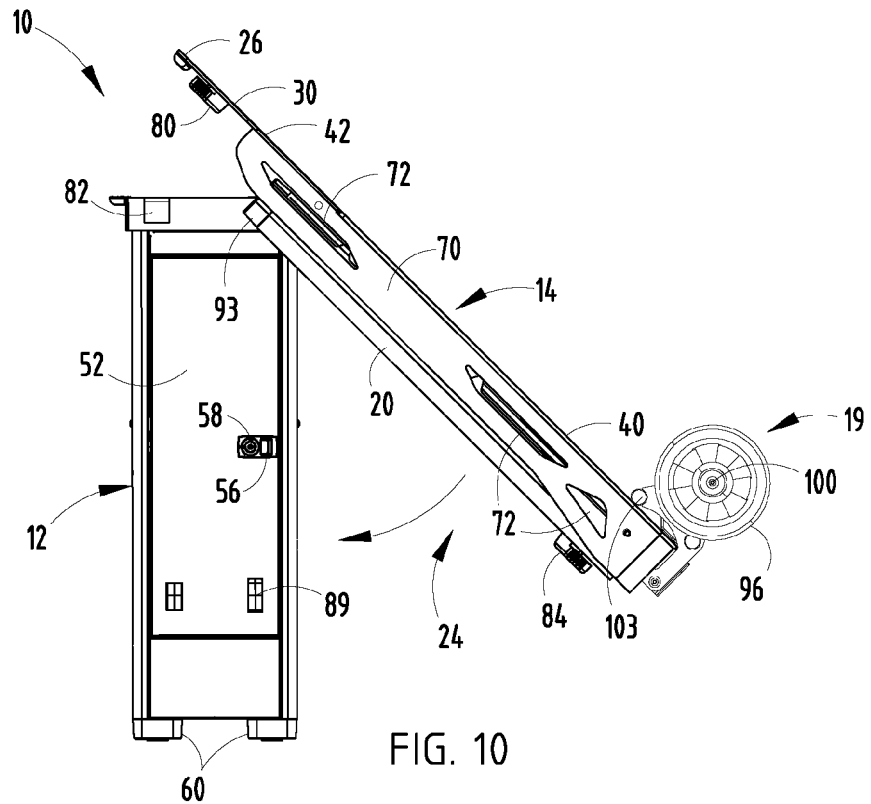
FIG. 10 is another front elevational view of the mobile treatment table of FIG. 1 transitioning from the operable position to the mobile position.
Figure 11:
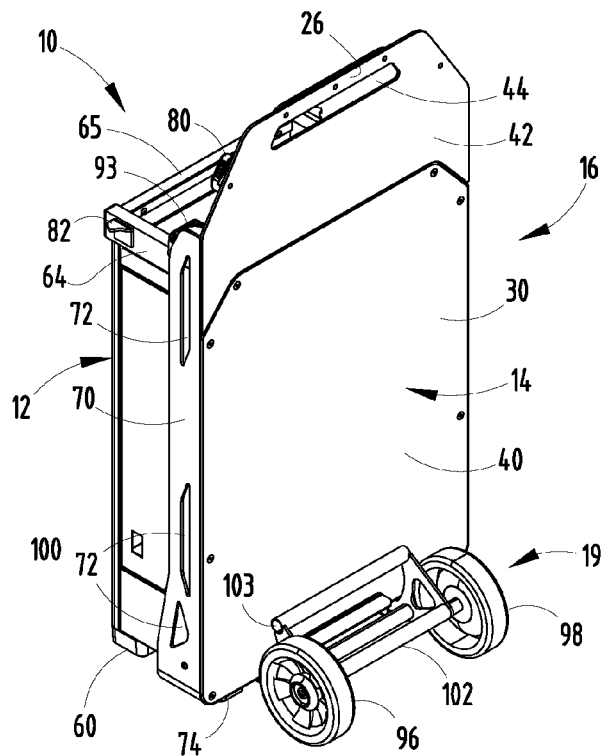
FIG. 11 is a top perspective view of the mobile treatment table of FIG. 1 in the mobile position.

Referring to FIG. 1, the reference numeral 10 generally designates a mobile treatment table having a central support 12 and a support member 14 that is pivotally connected with the central support 12 and operable between a vertical position 16 (FIG. 11) and a horizontal position 18. A wheel assembly 19 (FIG. 2) is operably connected with the support member 14. At least one support leg 20 is disposed at a distal end of the support member 14 and is operable between a deployed position 22 (FIG. 2) orthogonal to the support member 14 and a non-deployed position 24 (FIG. 10) substantially parallel with the support member 14. A handle 26 extends from a proximal end 28 of the support member 14 and forms a support member 30 when the support member 14 is in the horizontal position 18.

Figure 2:
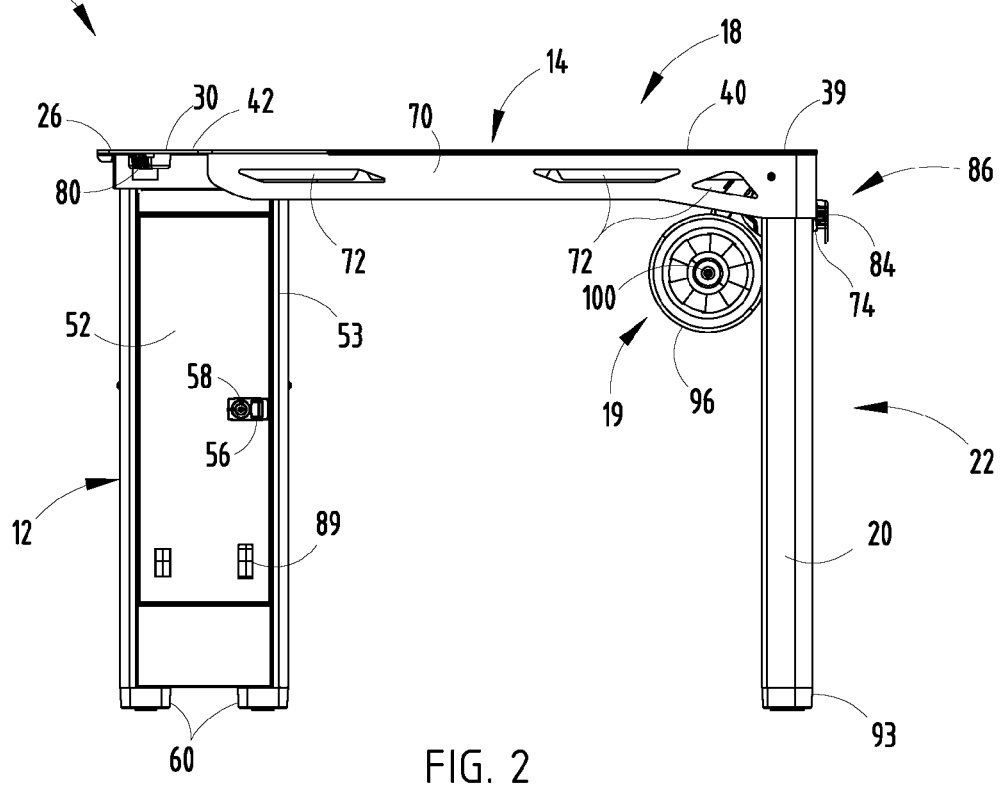
FIG. 2 is a front elevational view of the mobile treatment table of FIG. 1.
Figure 3:
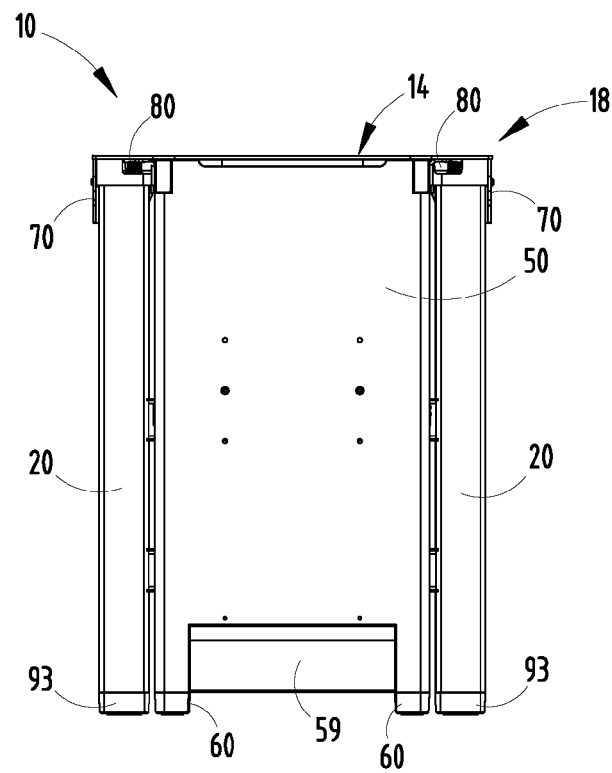
FIG. 3 is a side elevational view of the mobile treatment table of FIG. 1.

Referring now to FIGS. 1 and 2, the legs 20 are pivotally connected with a distal end 39 of the support member 14 of the mobile treatment table 10. The support member 14 includes a first portion 40 and a second portion 42, wherein the first portion 40 is generally larger than the second portion 42 and extends across the mobile treatment table 10 and over the support legs 20. The second portion 42 extends over the central support 12 and is integral with the handle 26. The handle 26 at the proximal end 28 of the table 10 is defined by a handle aperture 44 that extends through the second portion 42 of the support member 14.

Figure 4:
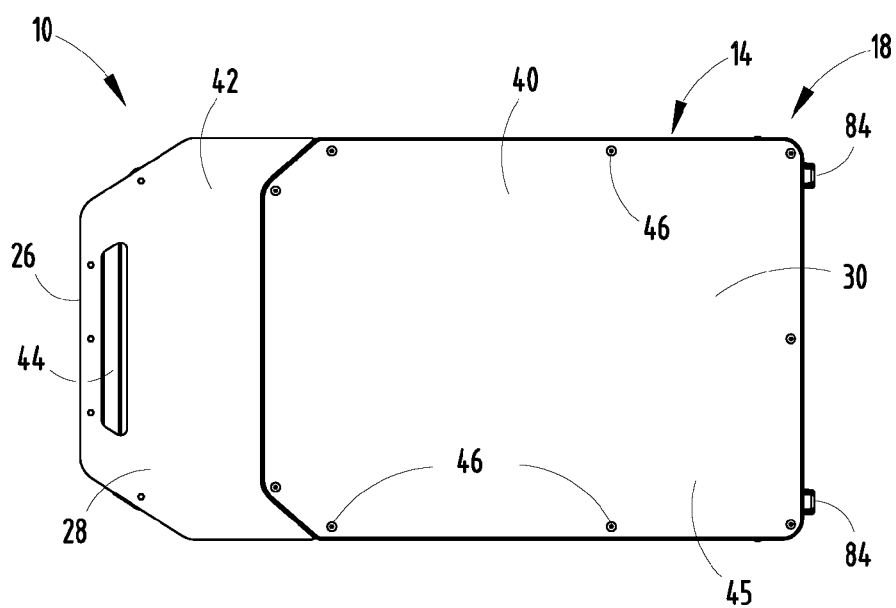
FIG. 4 is a top plan view of the mobile treatment table of FIG. 1.
Figure 5:
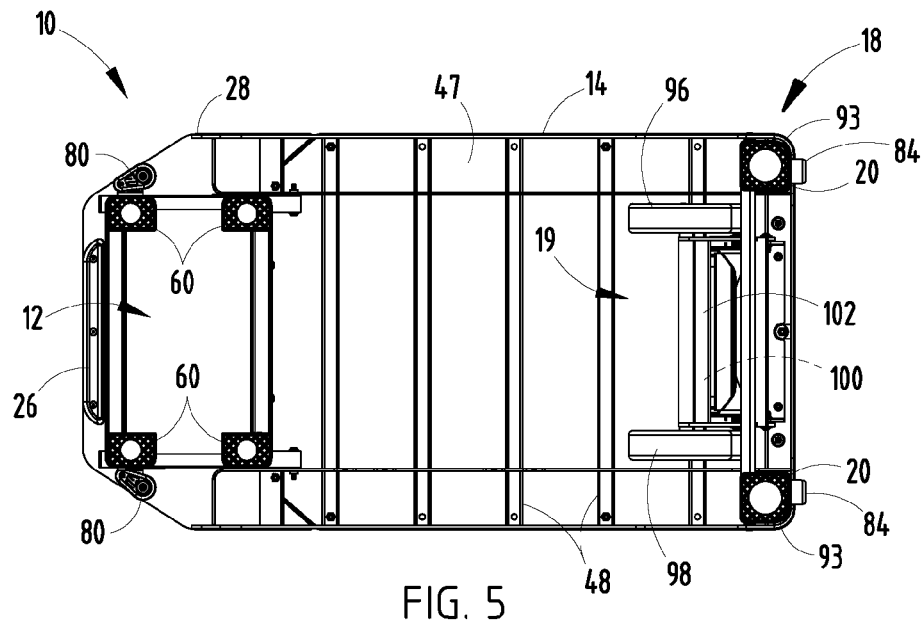
FIG. 5 is a bottom plan view of the mobile treatment table of FIG. 1.

As shown in the illustrated embodiment in FIGS. 4 and 5, the support member 14 includes a top side 45 and a bottom side 47. The bottom side 47 of the support member 14 includes support slats 48 that provide structural support to the support member 14. The support slats 48 extend laterally across the underside of the mobile treatment table 10 perpendicular to the longitudinal extent of the support member 14, but it is contemplated that the support slats 48 could extend in any direction relative to the support member 14. The support member 14 also includes mechanical fasteners 46 that extend through the top side 45 and secure the first portion 40 in place over the mobile treatment table 10. It is contemplated that the support member 14 may be covered with at least one of an anti-microbial and anti-fungal material. The support member 14 and the other components of the mobile treatment table 10 are adapted for ease and cleanability. The support member 14 is constructed of a material that allows for broad use of cleaning chemicals without damaging the support member 14. Thus, the support member 14 has exceptional surface durability, which allows for long life of the mobile treatment table 10.

Figure 6:
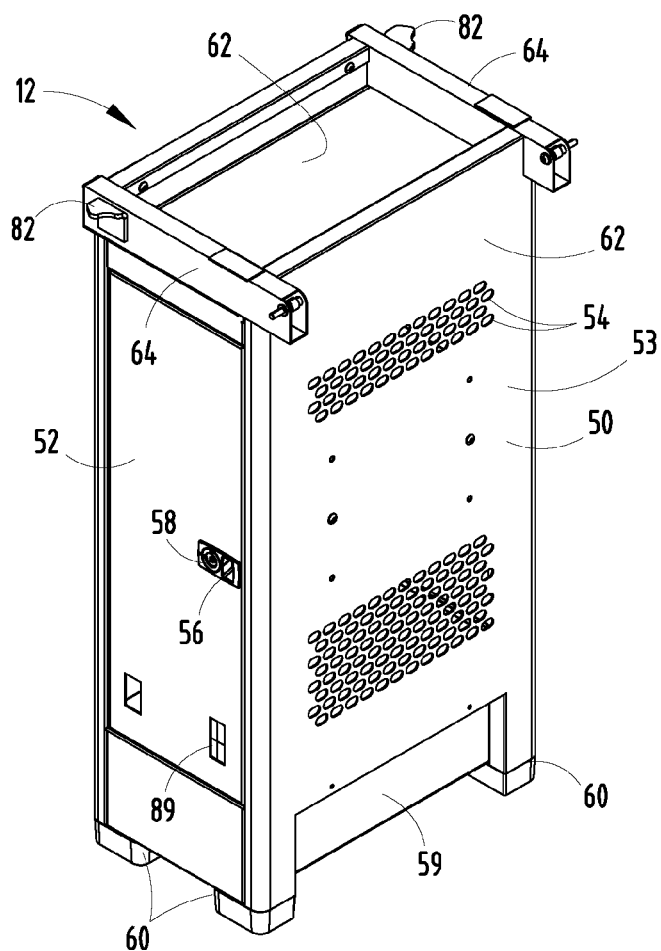
FIG. 6 is a top perspective view of a central support of the mobile treatment table of FIG. 1.
Figure 7:
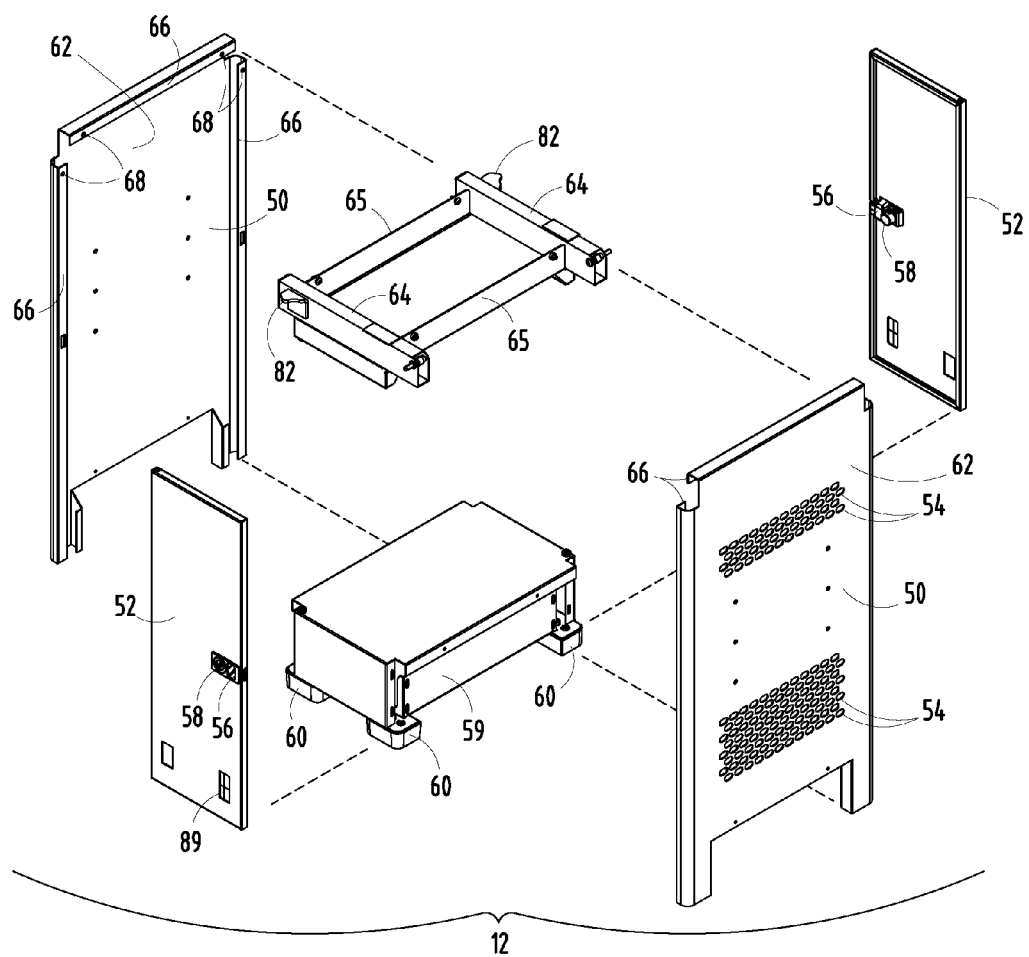
FIG. 7 is a top perspective exploded view of the central support of the mobile treatment table of FIG. 1.

Referring now to the illustrated embodiment of FIGS. 6 and 7, the central support 12 includes a box-like configuration having a plurality of walls 50 and one or more access doors 52 that define a storage unit 53. One or more of the walls 50 may include ventilation apertures 54 that allow for air flow into and out of the storage unit 53. The access door 52 includes a latch 56 that secures the access door 52 in the closed position. The latch 56 may include a lock mechanism 58, such that the contents disposed inside the storage unit 53 may be secured. The central support 12 includes a base 59 having several feet 60 that support the central support 12 in a vertical position. A top portion 62 of the central support 12 includes abutment members 64 that are in contact with both the first portion 40 and the second portion 42 of the support member 14 when the support member 14 is in the horizontal position 18. Cross-members 65 extend between the support members 64. The walls 50 shown in FIG. 7 include flanges 66 that provide additional structural rigidity to the central support 12 and also provide connecting apertures 68 so that mechanical fasteners can be used to hold the central support 12 together. It is also contemplated that the storage unit 53 may include multiple shelves (not shown) adapted to support items in the central support 12. The central support 12 may also include an oxygen tank holder adapted to support compressed oxygen for treating users. Specifically, oxygen may be routed through an air hose from the oxygen tank disposed inside the central support 12 to a user and administered by a physician. In addition, an exterior portion of the central support 12 may include an intravenous (IV) pole attachment adapted to support an IV drip in an elevated position above a user.

Referring again to FIGS. 1 and 2, a support flange 70 that is disposed about a perimeter of the support member 14 provides structural rigidity to the mobile treatment table 10 and includes one or more apertures 72 that minimize the weight of the mobile treatment table 10. The support flange 70 includes two flange tabs 74 proximate the legs 20, the use of which is discussed in greater detail below. The structural flange 70 also includes a recessed portion that allows for rotation of the wheel assembly 19 between a retracted position 75 and an extended position 76.

Figure 8:
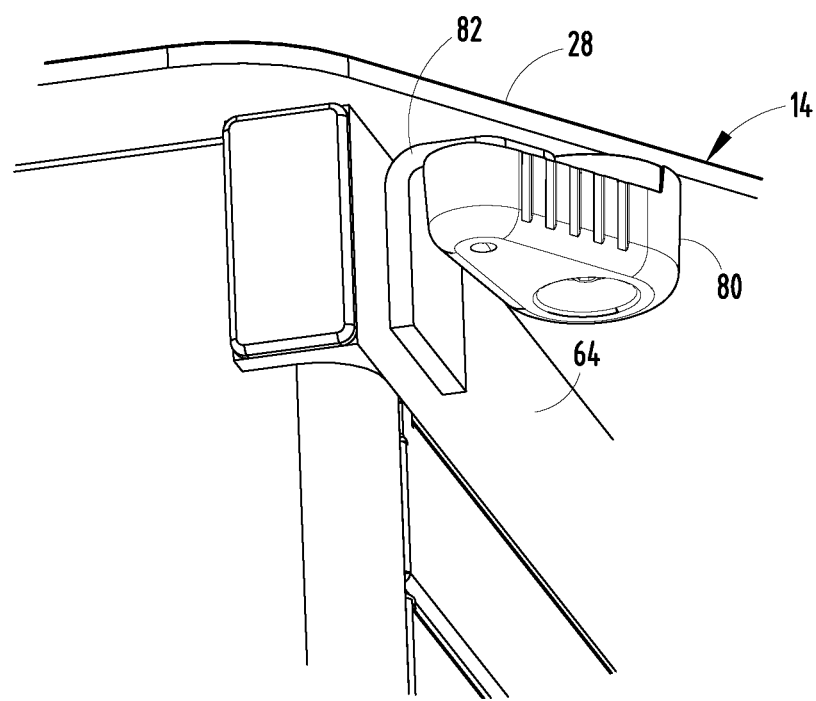
FIG. 8 is an enlarged partial bottom perspective view of a lever and tab of the mobile treatment table of FIG. 1.
Figure 9:
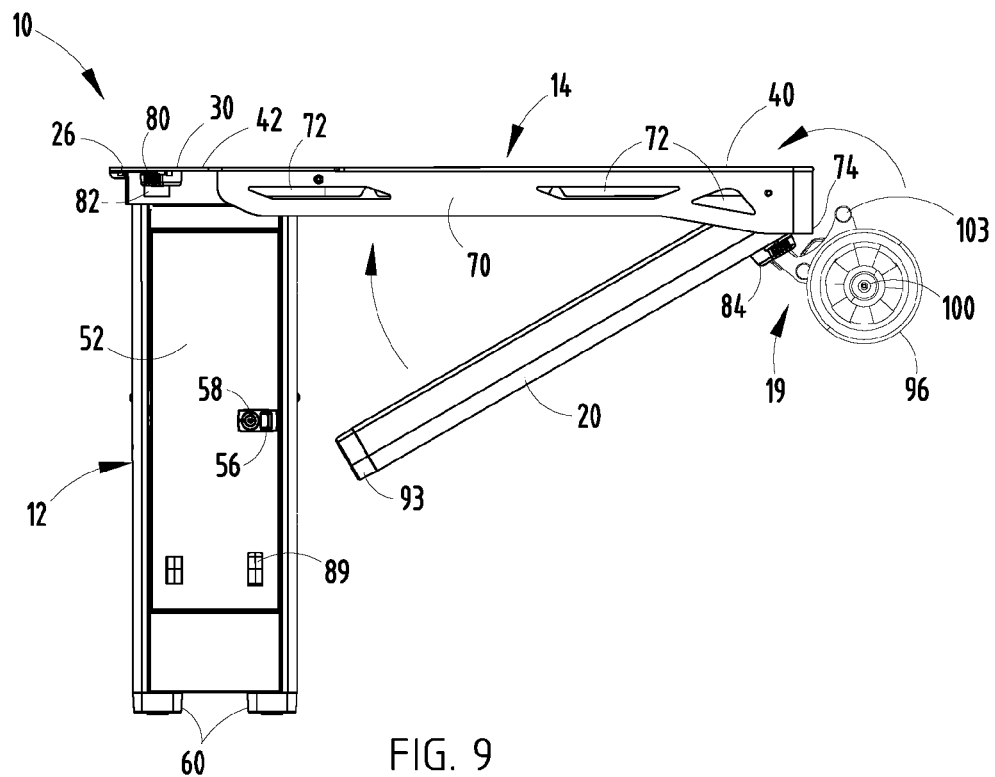
FIG. 9 is a front elevational of the mobile treatment table of FIG. 1 transitioning from the operable position to the mobile position.

Referring now to FIGS. 1, 2, and 8, the mobile treatment table 10 includes a first set of locking levers 80 that are pivotally connected to the bottom side 47 of the support member 14. The locking levers 80 are adapted for rotatable engagement with central support tabs 82 disposed on the abutment members 64. When the support member 14 is positioned in the horizontal position 18, the levers 80 can be rotated into secure engagement with the central support tabs 82, thus securing the mobile treatment table 10 in the horizontal position 18. To reposition the support member 14 from the horizontal position 18 to the vertical position 16, the levers 80 are rotated out of secure engagement with the central support tabs 82, thus allowing rotation of the support member 14 to the vertical position 16.

Figure 12:
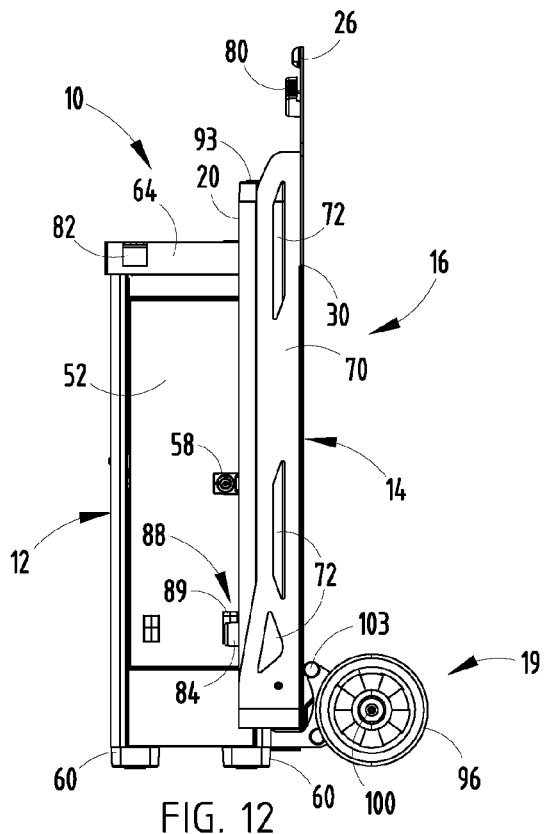
FIG. 12 is a front elevational view of the mobile treatment table of FIG. 11.
Figure 15:
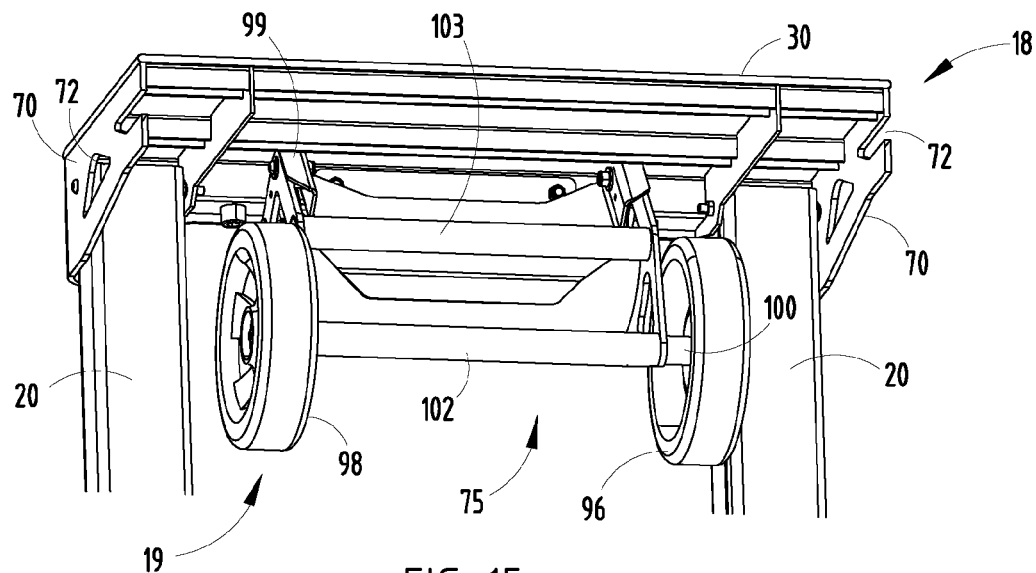
FIG. 15 is a bottom perspective view of a wheel assembly in the retracted position.
Figure 16A:
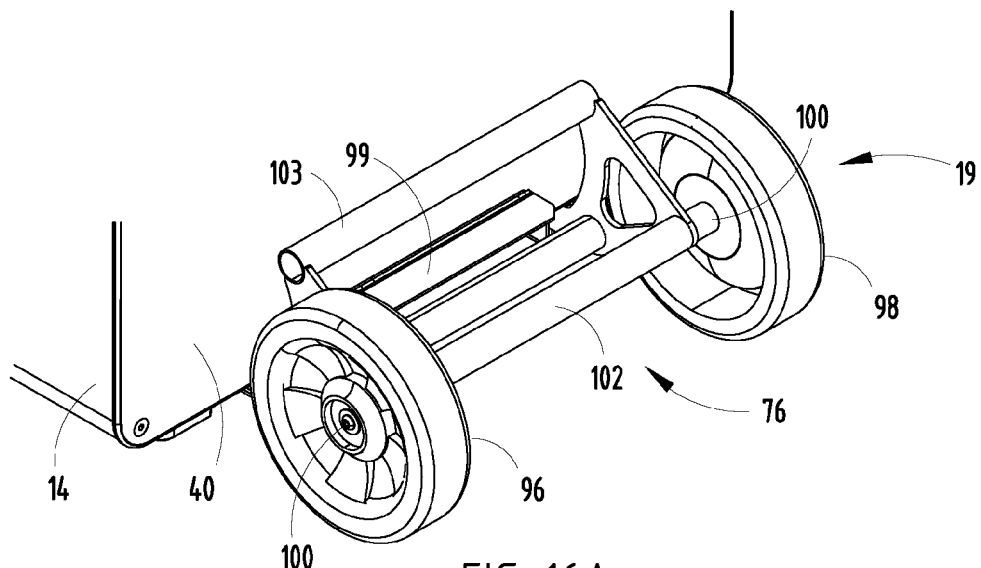
FIG. 16A is a top perspective view of one embodiment of the wheel assembly of FIG. 15 in the extended position.
Figure 16B:
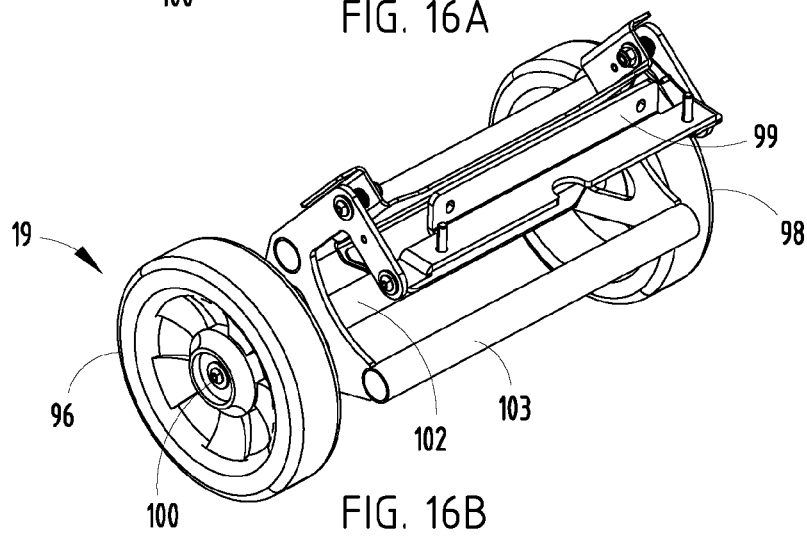
FIG. 16B is a top perspective view of the wheel assembly of FIG. 15.

Referring again to FIGS. 1, 2, 9, and 10, a second set of locking levers 84 are rotatably connected with the legs 20. The locking levers 84 are positionable to lock the legs 20 in both the deployed position 22 and the non-deployed position 24. Specifically, the locking levers 84 may be rotated to a first position 86 when the legs 20 are deployed, wherein the locking levers 84 engage the flange tabs 74 that extend from the support flange 70. Once the locking levers 84 are engaged with the flange tabs 74, the legs 20 are locked into the deployed position 22 and the support member 14 is locked into the horizontal position 18. To reposition the support member 14 from the horizontal position 18 to the vertical position 16, the locking levers 84 are pivotally rotated out of engagement with the flange tabs 74. The legs 20 of the support member 14 are then rotated up under the support member 14 into the non-deployed position 24 and the support member 14 is rotated downwardly into the vertical position 16. The locking levers 84 are then rotated to a second position 88 (FIG. 12) into secure engagement with central support apertures 89, which lock the mobile treatment table 10 in the vertical and mobile position 16. The mobile treatment table 10 may be safely secured in a hard cover travel case or storage case after being set in the non-deployed position 24. The hard cover travel case is designed to minimize dings and scratches that may otherwise occur during transport of the mobile treatment table 10.

Figure 17A:
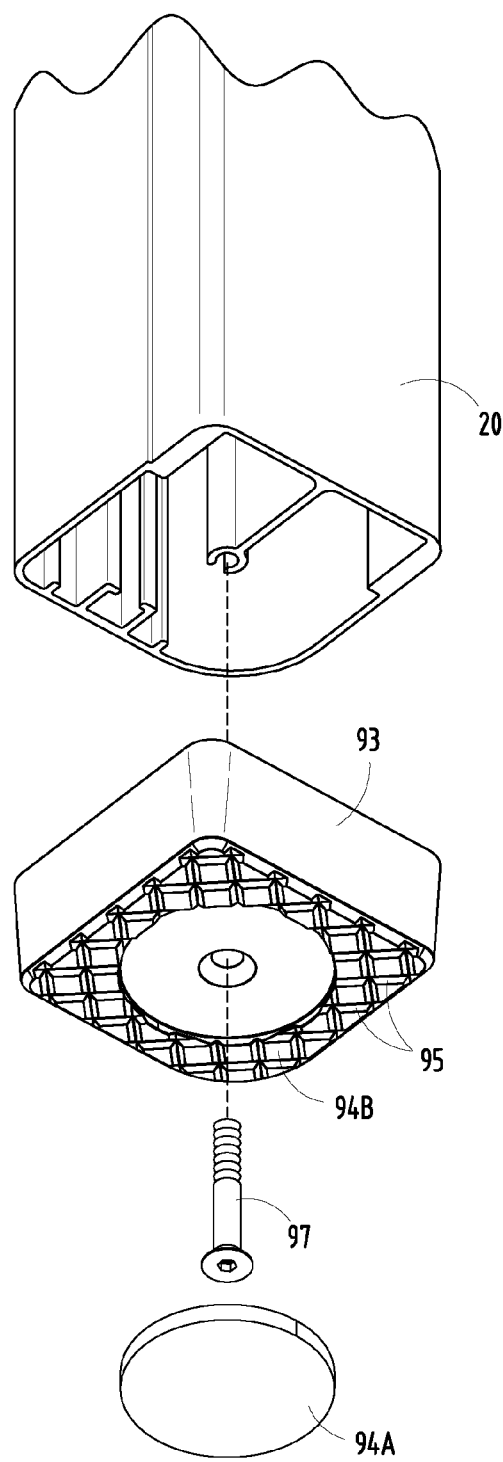
FIG. 17A is a bottom exploded elevational view of a leg of a mobile treatment table.
Figure 17B:
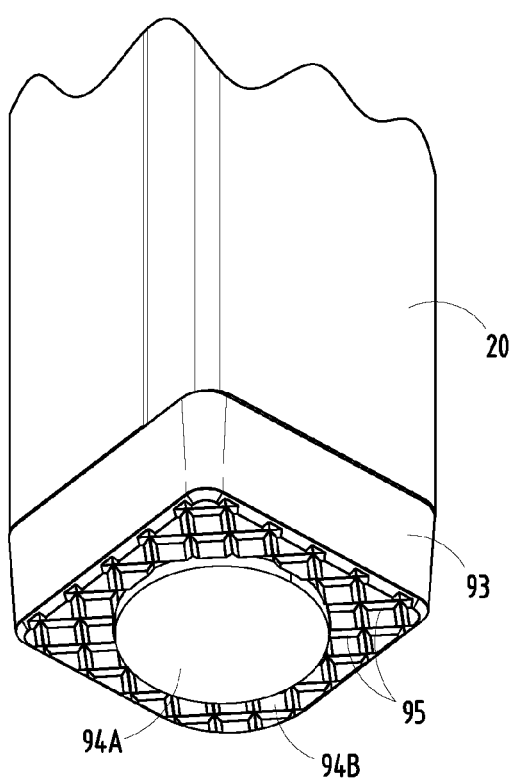
FIG. 17B is a bottom elevational view of a leg of a mobile treatment table.
Figure 18:
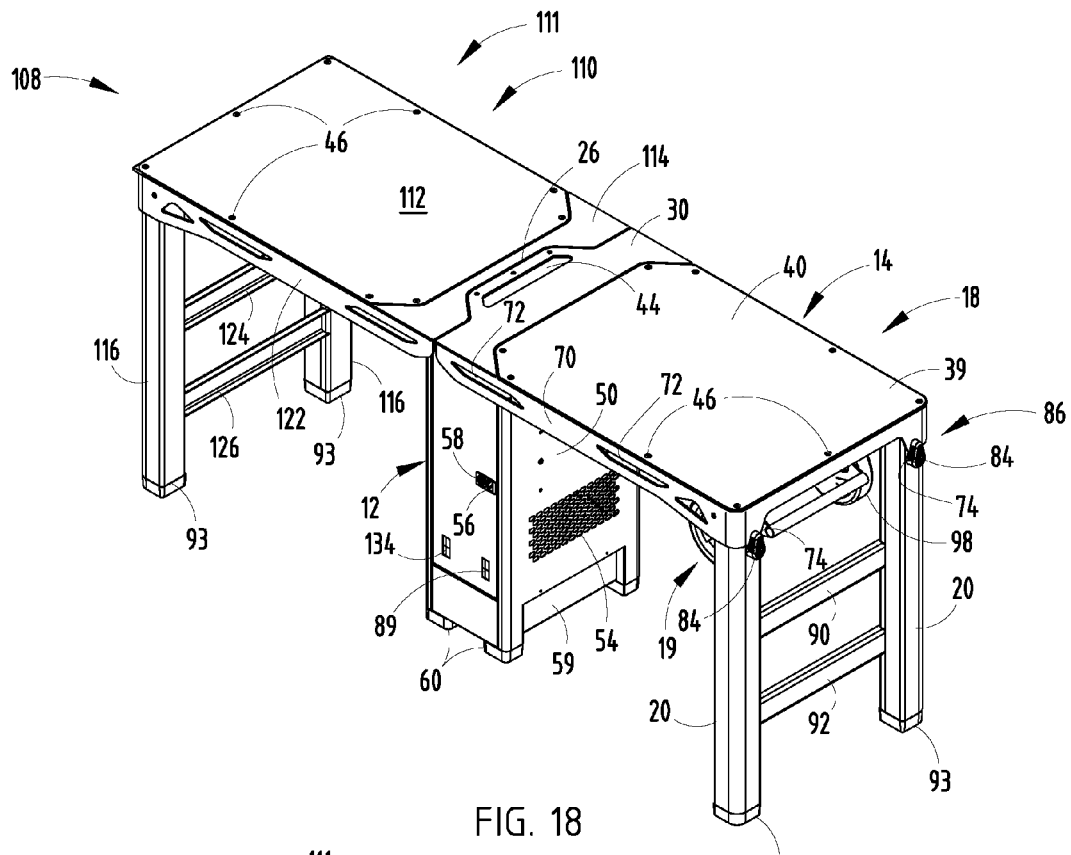
FIG. 18 is a top perspective view of another embodiment of a mobile treatment table.
Figure 19:
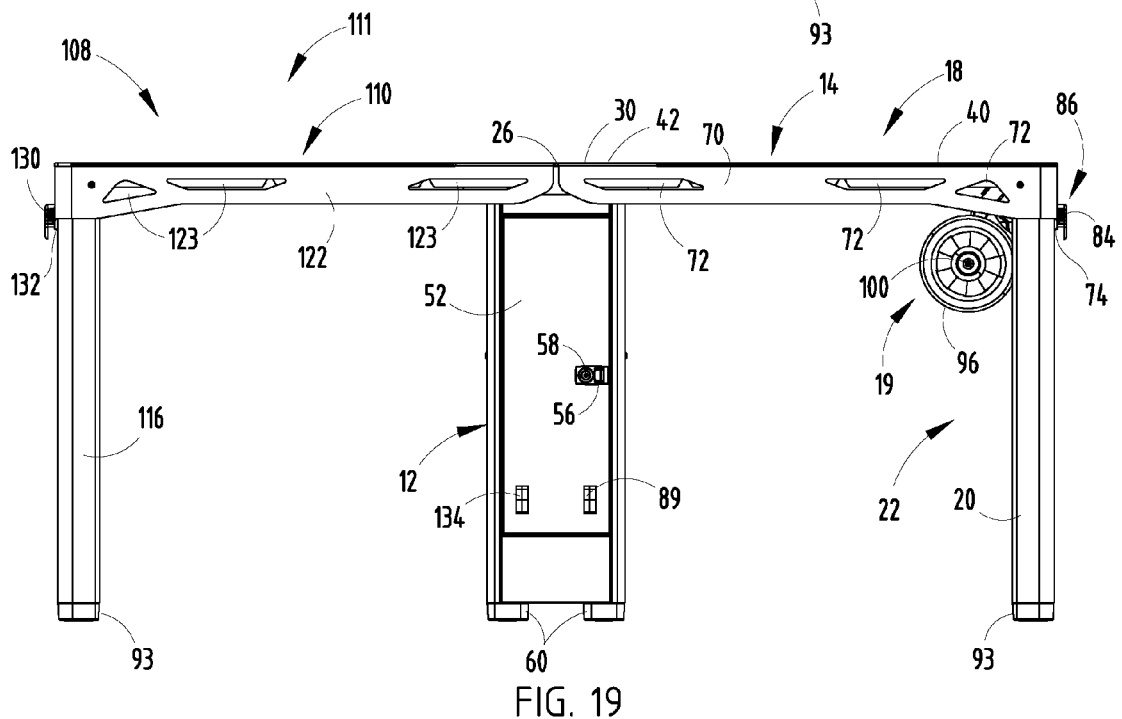
FIG. 19 is a front elevational view of the mobile treatment table of FIG. 18.
Figure 20:
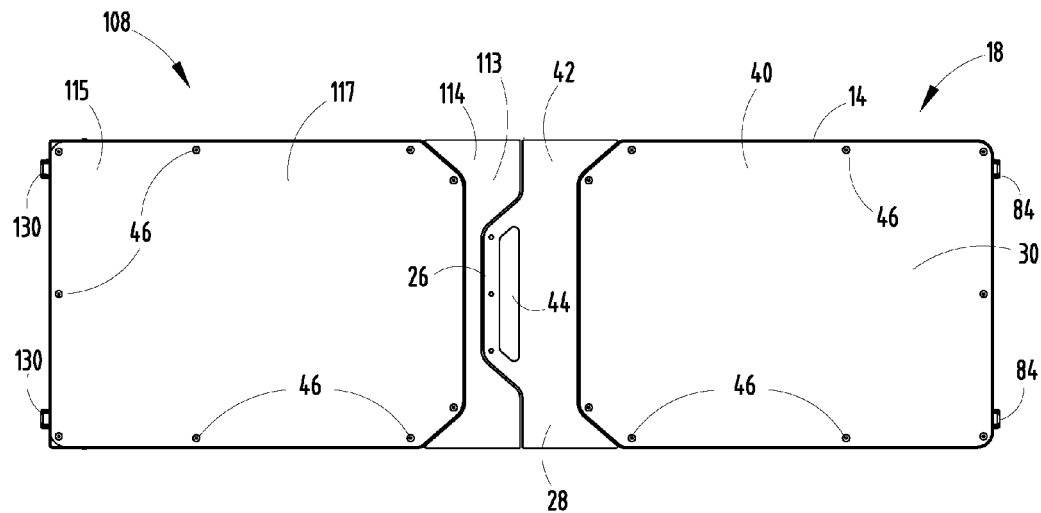
FIG. 20 is a top plan view of the mobile treatment table of FIG. 18.
Figure 21:
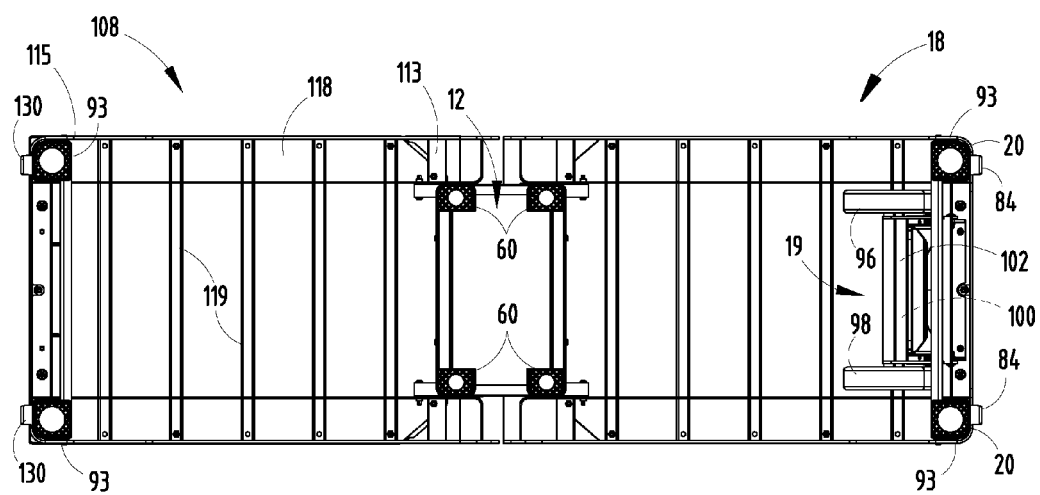
FIG. 21 is a bottom plan view of the mobile treatment table of FIG. 18.
Figure 22:
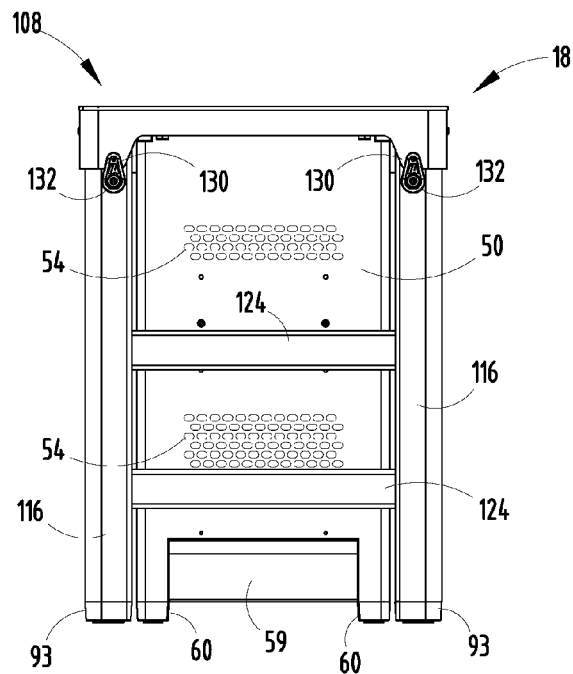
FIG. 22 is a side elevational view of the mobile treatment table of FIG. 18.

Referring again to FIGS. 1, 15, and 16A-17B, the legs 20 include first and second cross-braces 90, 92 that extend between the legs 20 and also provide structural rigidity to the mobile treatment table 10. As previously stated, feet 60 are disposed below the base 59 of the central support 12. In addition, larger feet 93 are disposed at the bottom of each leg 20. As shown in FIGS. 17A and 17B, each of the larger feet 93 includes a first bearing surface 94A having a circular shape and non-skid construction. The first bearing surface 94A is adapted for use on hard surfaces, such as asphalt, concrete, or wood. The first bearing surface 94A minimizes the likelihood of slipping on the hard surfaces. A second bearing surface 94B is larger than the first bearing surface 94A and extends around the first bearing surface 94A. The second bearing surface 94B is not co-planar with the planar extent of the first bearing surface 94A, but instead is recessed a predetermined distance above the planar extent of the first bearing surface 94A. The second bearing surface 94B provides additional support to the first bearing surface 94A when the mobile treatment table 10 is used on less stable surfaces, such as grass or sand. The second bearing surface 94B includes a multitude of channels 95 adapted to dig into irregular surfaces and provide additional frictional support to each of the legs 20. The first bearing surface 94A is held in place by an adhesive while the second bearing surface 94B is held in place by a mechanical fastener 97 that is received into a bottom portion of each of the legs 20. It is contemplated that the legs 20 may include height adjustability or self-leveling feet to provide further versatility when the mobile treatment table 10 is used on irregular surfaces. The wheel assembly 19 is disposed adjacent to the distal end 39 of the support member 14 of the mobile treatment table 10 and mounted via a connecting bracket 99 with the bottom side 47 of the support member 14.

Referring again to FIGS. 15, 16A, and 16B, the wheel assembly 19 is rotatable to the retracted position 75 proximate the bottom side 47 of the support member 14 and to the extended position 76 proximate the top side 45 of the support member 14. The wheel assembly 19 includes first and second wheels 96, 98 that are connected by a wheel axle 100. The wheel axle 100 is disposed inside a sleeve 102, such that the mobile treatment table 10, when in the mobile position 16, can be transported by pulling the handle 26 laterally, which causes the mobile treatment table 10 to move as the wheels 96, 98 rotate relative to the wheel axle 100. The wheel assembly 19 also includes a wheel brace 103 offset from the sleeve 102 that is designed to abut the top side 45 of the support member 14. When the wheel assembly 19 is in the fully extended position 76, the wheel brace 103 contacts the top side 45 of the support member 14. It is contemplated that the first and second wheels 96, 98 may include air-filled or foam-filled tires, depending on a user's desire. Furthermore, it is contemplated that the mobile treatment table 10 may be accommodated with axle-receiving apertures designed to receive axles of all terrain wheels 107, as shown in FIG. 14B.

Figure 28:
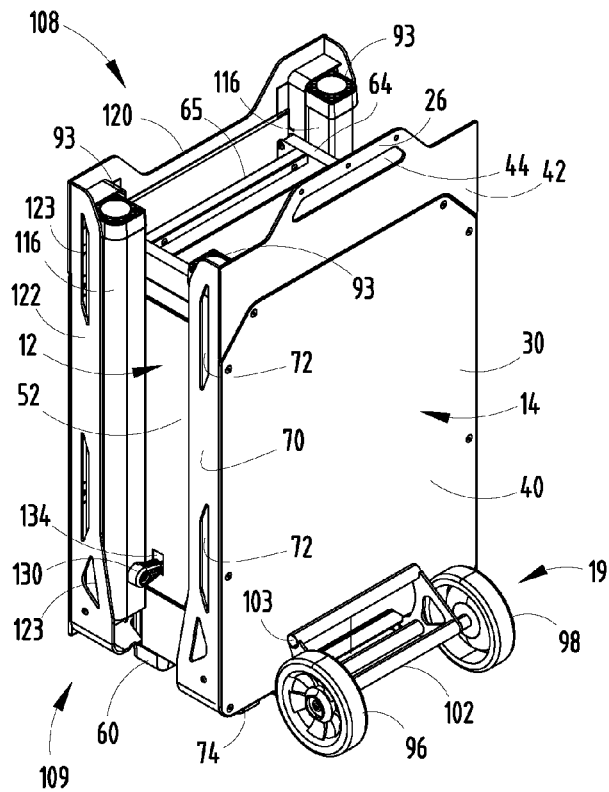
FIG. 28 is a top perspective view of the mobile treatment table of FIG. 18 in the mobile position.
Figure 29:
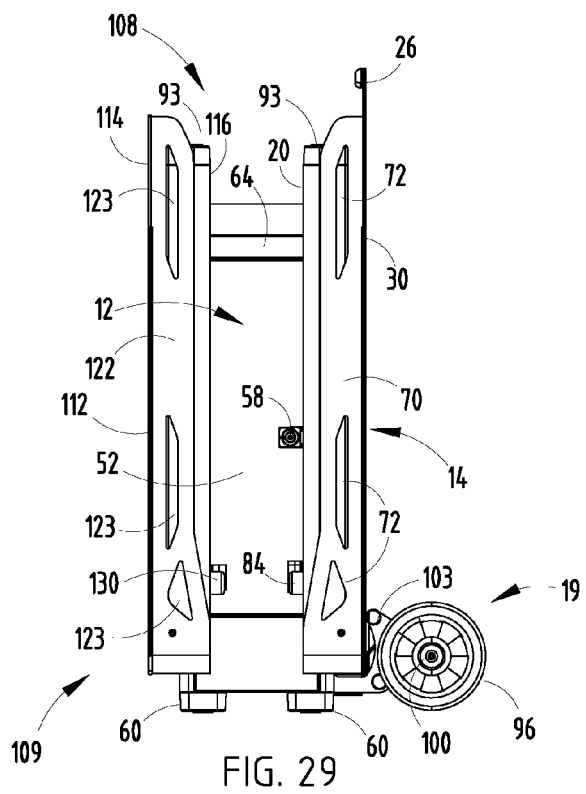
FIG. 29 is a front elevational view of the mobile treatment table of FIG. 28.

Referring now to FIGS. 18-25, another embodiment of a mobile treatment table 108 includes a supplemental support member 110 designed to work in conjunction with the support member 14. The supplemental support member 110 is operable between a vertical position 109 and a horizontal position 111. The supplemental support member 110 is pivotal about a hinge disposed at a proximal end 113 of the mobile treatment table 108. Supplemental legs 116 extend from a distal end 115 of the mobile treatment table 108. The supplemental support member 110 includes a first portion 112 and a second portion 114, wherein the first portion 112 is larger than the second portion 114 and extends over the supplemental legs 116. The second portion 114 of the supplemental support member 110 includes a recess 120 (FIG. 28) designed to receive the handle 26 on the support member 14 when the supplemental support member 110 and the support member 14 are in the horizontal positions 18, 111. The supplemental support member 110 has a top side 117 and a bottom side 118 that includes support slats 119 that add structural rigidity to the mobile treatment table 108. A supplemental support flange 122 having apertures 123 extends around the supplemental support member 110 and provides support and structural rigidity to the supplemental support member 110.

Figure 23:
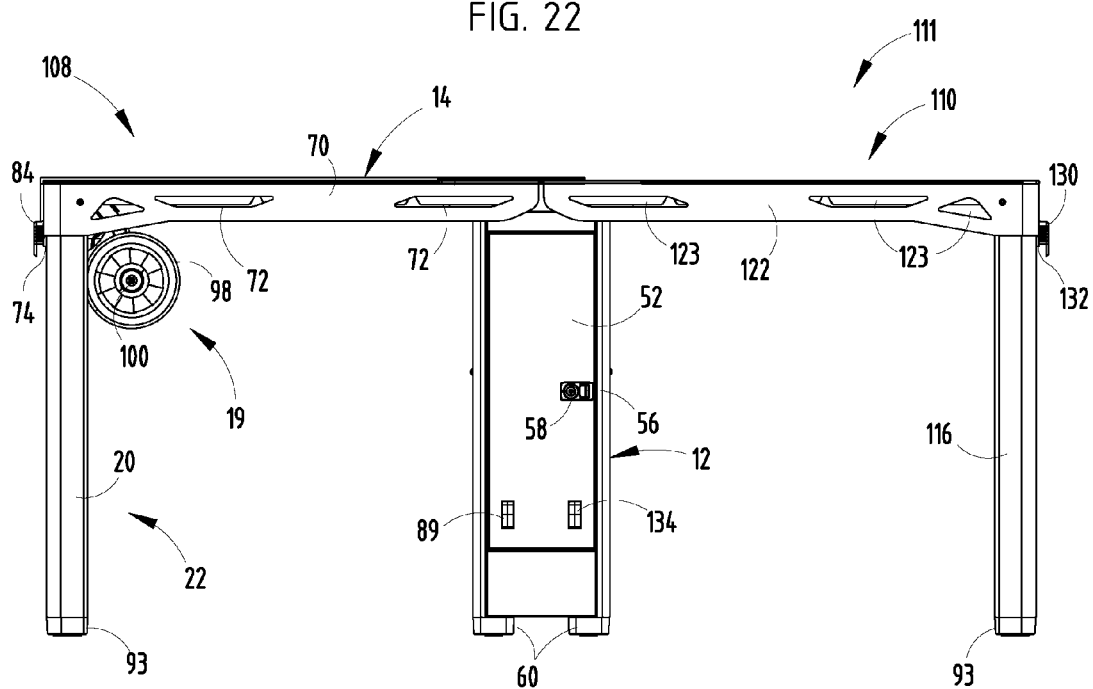
FIG. 23 is a rear elevational view of the mobile treatment table of FIG. 18.
Figure 24:
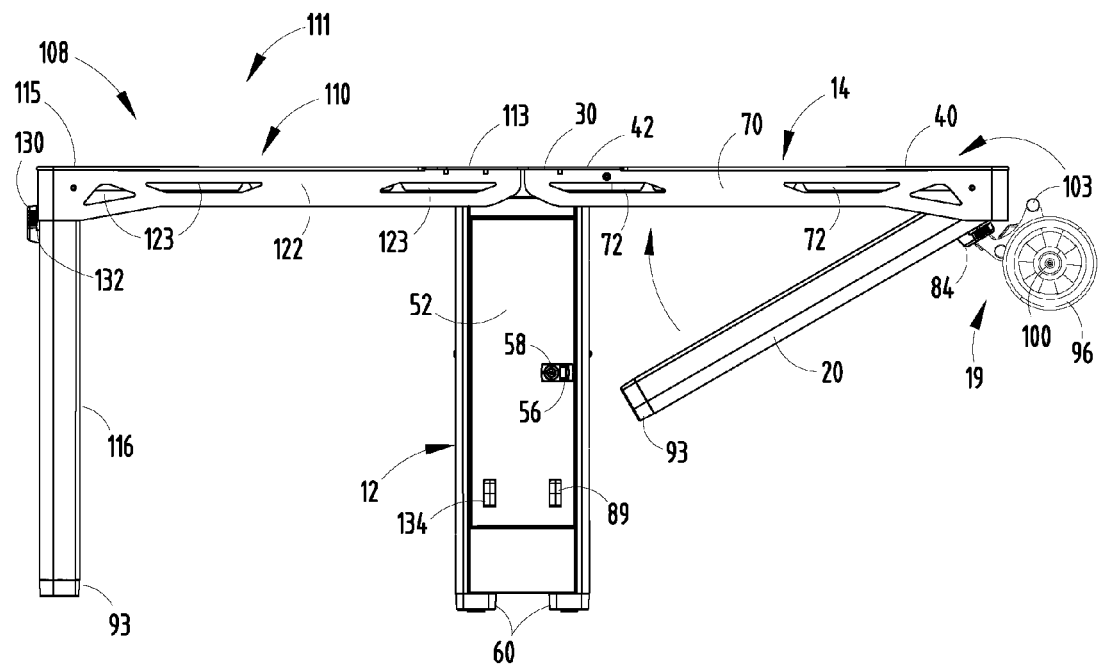
FIG. 24 is a side elevational view of the mobile treatment table transitioning to the mobile position.
Figure 25:
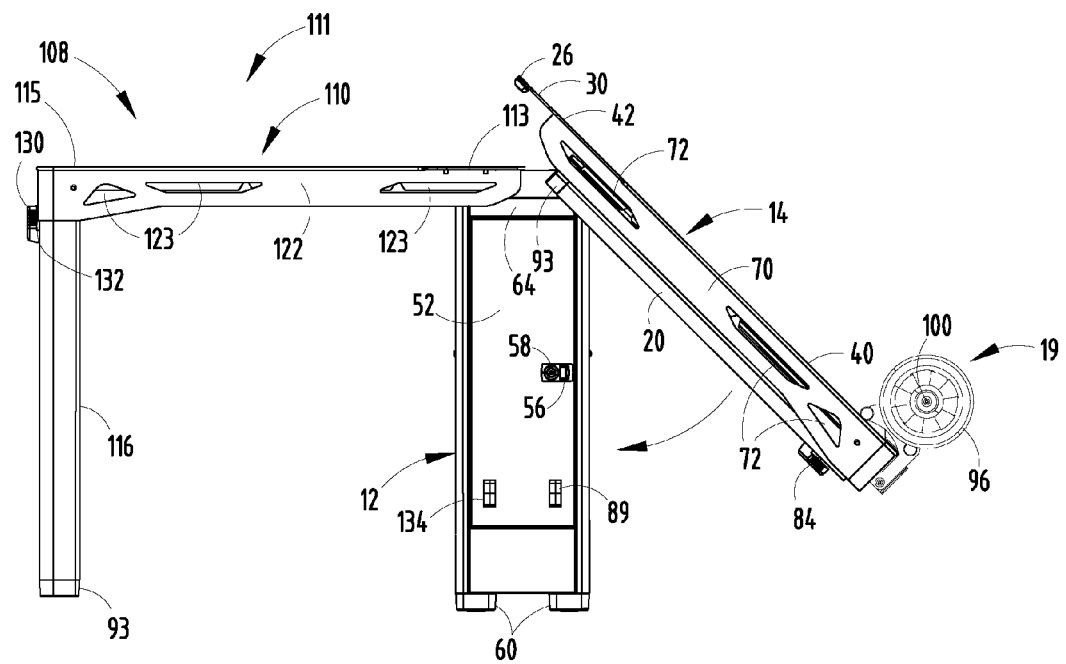
FIG. 25 is a side elevational view of the mobile treatment table transitioning to the mobile position.
Figure 26:
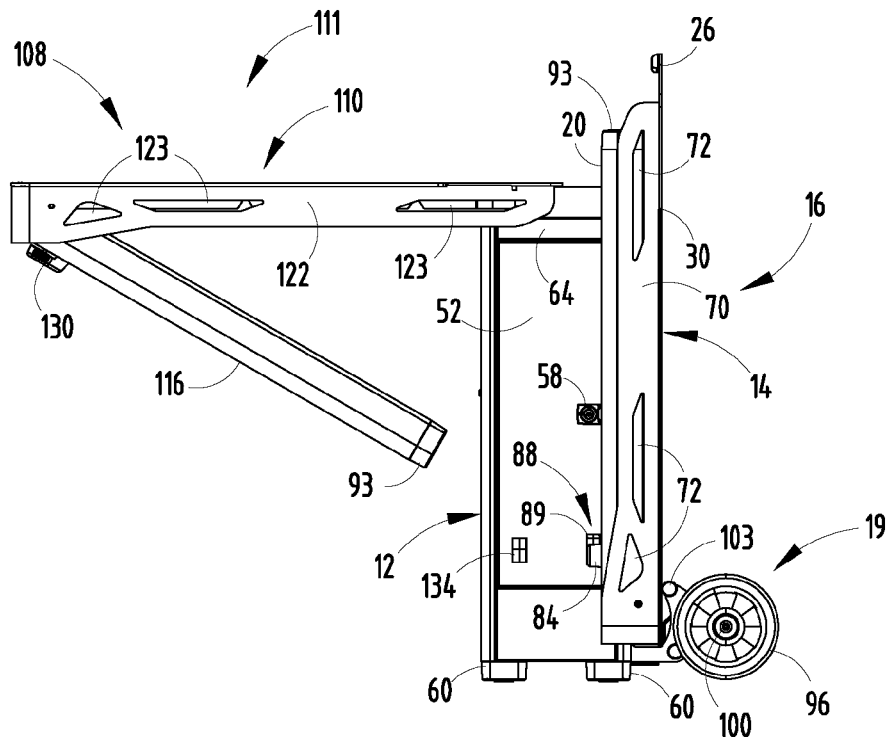
FIG. 26 is a side elevational view of the mobile treatment table transitioning to the mobile position.
Figure 27:
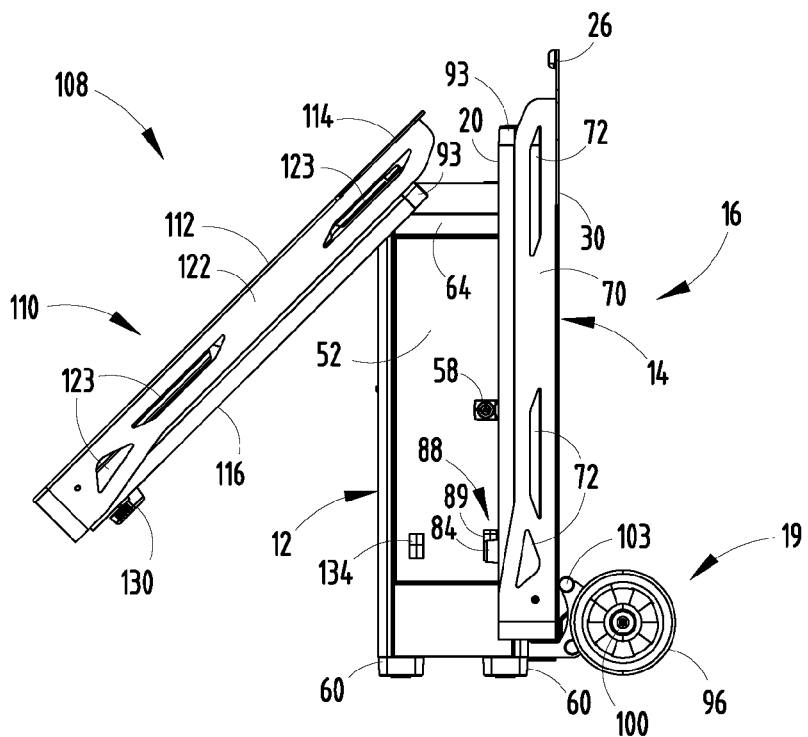
FIG. 27 is a side elevational view of the mobile treatment table transitioning to the mobile position.

Referring again to FIGS. 18-25, first and second cross-braces 124, 126 extend between the supplemental legs 116 and also provide additional rigidity to the mobile treatment table 108. Similar to the support member 14, the supplemental support member 110 includes locking levers 130 pivotally connected to legs 116 that operate similarly to locking levers 84 of the previously discussed embodiment. The locking levers 130 are designed to engage flange tabs 132 to maintain the supplemental support member 110 in the horizontal position 111 when the mobile treatment table 108 is being used to treat an individual (FIG. 23). The locking levers 130 are also pivotally engageable with central support apertures 134 when the supplemental support member 110 is placed in the vertical position 109 when the mobile treatment table 108 is being mobilized.

Referring now to FIGS. 24-28, the mobile treatment table 108 is designed to transition from an operable position to a mobile position. To move the mobile treatment table 108 to the mobile position, the locking levers 84, 130 are disengaged from their respective support flange tabs 74, 132, such that legs 20, 116 may be rotated inwardly. The support member 14 and the supplemental support member 110 are then rotated to the vertical positions 16, 109 until the bottom side 47 of the support member 14 and the bottom side 118 of the supplemental support member 110 are in abutting contact with the central support 12. The locking levers 84, 130 are then rotated into engagement with the central support apertures 89, 134 in the central support 12. The mobile treatment table 108 is now in the mobile position (FIGS. 28-32). The mobile treatment table 108 can now be pulled by the handle 26 at an angle to the ground, which allows the wheel assembly 19 to easily roll over the ground Multiple embodiments of the mobile treatment table 10, as defined above, are designed for longevity and include exceptional weather resistance. Accordingly, the mobile treatment table 10 is designed for use both indoors and outdoors. It is also contemplated that the mobile treatment table 10 may include a weather resistant cover that can be placed over the mobile treatment table 10 to prevent the mobile treatment table 10 from snow accumulation or rain accumulation.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A mobile treatment table comprising:
 a center support;
 a support member defining a planar support surface having a top side and a bottom side, the support member being pivotally connected with the center support, and operable between a vertical position and a horizontal position;

a wheel assembly rotatably connected to the support member, the wheel assembly operable between an extended position disposed adjacent the top side and a retracted position disposed adjacent the bottom side;

at least one support leg disposed at a distal end of the support member and operable between a deployed position substantially orthogonal to the support member and a non-deployed position substantially parallel with the support member, wherein the wheel assembly pivots independently of the support member and the at least one support leg; and a handle that extends from a proximal end of the support member and that forms a portion of the support member when the support member is in the horizontal position.

2. The mobile treatment table of claim 1, further comprising: at least one storage unit disposed in the center support.

3. The mobile treatment table of claim 1, further comprising: a support flange disposed about a perimeter of the support member.

4. The mobile treatment table of claim 1, further comprising: a securing latch operable between a first position that secures the support member in the vertical position and a second position that secures the at least one support leg in the deployed position.

5. The mobile treatment table of claim 1, further comprising: support slats connected with and disposed below the support member.

6. The mobile treatment table of claim 1, wherein the support member includes at least one of an anti-microbial and anti-fungal material disposed on the support member.

7. The mobile treatment table of claim 1, wherein the support member includes a first portion and a second portion, and wherein a handle aperture is formed in the first portion.

8. The mobile treatment table of claim 1, wherein the at least one leg includes a first set of legs pivotally connected to the support member and connected by at least one cross-member.

* * * * *